(12) United States Patent
Lambke

(10) Patent No.: US 6,788,767 B2
(45) Date of Patent: Sep. 7, 2004

(54) APPARATUS AND METHOD FOR PROVIDING CALL RETURN SERVICE

(75) Inventor: Jay V. Lambke, Mission Viejo, CA (US)

(73) Assignee: Gateway, Inc., Poway, CA (US)

( * ) Notice: Subject to any disclaimer, the term of this patent is extended or adjusted under 35 U.S.C. 154(b) by 349 days.

(21) Appl. No.: 09/754,049

(22) Filed: Dec. 28, 2000

(65) Prior Publication Data

US 2002/0085688 A1 Jul. 4, 2002

(51) Int. Cl.⁷ .............................................. H04M 11/00
(52) U.S. Cl. ............................... 379/88.01; 379/88.14; 379/88.24; 379/281; 704/500; 704/236; 704/238
(58) Field of Search ............................... 379/88.01, 76, 379/88.14, 281, 387.02, 67.1, 88.24; 704/238, 241, 236, 232, 254, 255, 256, 257, 251, 234, 500; 455/413, 422; 709/246

(56) References Cited

U.S. PATENT DOCUMENTS

| | | | | |
|---|---|---|---|---|
| 4,785,473 A | * | 11/1988 | Pfeiffer et al. | 379/88.24 |
| 4,870,686 A | * | 9/1989 | Gerson et al. | 704/234 |
| 4,896,358 A | * | 1/1990 | Bahler et al. | 704/257 |
| 5,163,083 A | * | 11/1992 | Dowden et al. | 379/88.03 |
| 5,181,237 A | * | 1/1993 | Dowden et al. | 379/88.03 |
| 5,610,973 A | * | 3/1997 | Comer | 455/413 |
| 5,719,921 A | | 2/1998 | Vysotsky et al. | 379/189 |
| 5,732,216 A | | 3/1998 | Logan et al. | 395/200.33 |
| 5,805,672 A | | 9/1998 | Barkat et al. | 379/67 |
| 5,822,727 A | * | 10/1998 | Garberg et al. | 704/270.1 |
| 5,953,392 A | | 9/1999 | Rhie et al. | 379/88.13 |
| 5,978,671 A | | 11/1999 | Foladare et al. | 455/412 |
| 5,987,102 A | | 11/1999 | Elliott et al. | 379/93.17 |
| 5,999,611 A | | 12/1999 | Tatchell et al. | 379/211 |
| 6,018,568 A | | 1/2000 | Furman et al. | 379/93.15 |

(List continued on next page.)

FOREIGN PATENT DOCUMENTS

JP          09-233226    * 9/1997 .......... H04M/11/00

OTHER PUBLICATIONS http://ba.com/nr/96/feb/2–15talkdial.html, "Bell Atlantic Nynex Mobile Debuts Unique Voice Dialing Service, Talkdial," printed May 15, 2000.

http://www.comversens.com/prodserv/services/services.htm, "Services Portfolio: The Power of Enhanced Communications," printed May 16, 2000.

http://web.lexis–nexis.com/ln.universe/ . . . b&_md5=4db197ecf82589b9fla6cc00bf3401fl, "Telecom firm's new unit stays in tune with new features," by Manalang et al., printed May 2, 2000.

http://mobile.ericsson.se/spg.asp?Temp1 . . . MobPhoneCombo&Man=Man_link1&ProdId=9316, "Make Yourself Heard," printed May 16, 2000.

http://www.phone.com/solutions/alliances/Comverse.html, "Mobile Visual Mailbox," printed May 16, 2000.

wysiwyg.//contents.16/http://www.busine . . . be.philips.com/inet/news/cebit2000.htm, "Discover IP with Philips," printed May 3, 2000.

Primary Examiner—Fan Tsang
Assistant Examiner—Md. Shafiul Alam Elahee
(74) Attorney, Agent, or Firm—Scott Charles Richardson; Chad W. Swantz; Suiter-West

(57) ABSTRACT

An apparatus and method for enabling provision of a call return service is disclosed. The apparatus utilizes a method of generating telephone numbers from voice messages. The method includes the step of using speech recognition to isolate a spoken number in a voice message, and confirming to a high degree of accuracy that the spoken number represents a telephone number. The method further includes the step of converting the spoken number into a data sequence representing the telephone number. This data sequence is then made available for immediate or later use.

20 Claims, 4 Drawing Sheets

U.S. PATENT DOCUMENTS

| | | | |
|---|---|---|---|
| 6,029,135 A | 2/2000 | Krasle | 704/275 |
| 6,049,594 A | 4/2000 | Furman et al. | 379/67.1 |
| 6,169,911 B1 | 1/2001 | Wagner et al. | 455/566 |
| 6,249,765 B1 * | 6/2001 | Adler et al. | 704/500 |
| 6,339,795 B1 * | 1/2002 | Narurkar et al. | 709/246 |
| 6,374,102 B1 * | 4/2002 | Brachman et al. | 455/422 |
| 6,396,906 B1 * | 5/2002 | Kaplan | 379/67.1 |
| 6,510,412 B1 * | 1/2003 | Sasai et al. | 704/257 |
| 2002/0030094 A1 * | 3/2002 | Curry et al. | 235/375 |

* cited by examiner

APPARATUS AND METHOD FOR PROVIDING CALL RETURN SERVICE

BACKGROUND OF THE INVENTION

1. Field of the Invention

The present invention relates generally to telephone systems and, more particularly, to methods and apparatus for activating telephone services utilizing telephone numbers contained within voice messages.

2. Related Art

Modern telecommunication systems and devices have provided significant increases in the number of available telecommunication services and improvements in the flexibility of use of those services. Included among these services are new telephone features such as voice-dialing and call-return. These new features, however, have generated additional problems while also opening the way for even further improvements.

Conventional call-return services are limited to the telephone number of the telephone that originated the call. Thus, if a person leaves a voice message that indicates the return call should be placed to a number other than the originating number, a traditional call-return service will not function properly. The person leaving the message may utilize a separate call-forwarding service such that a returned call is forwarded to a different telephone number. This approach, however, creates extra work for a caller and is thus undesirable.

Moreover, conventional call-return services typically rely upon access to a Caller ID signal received as part of the original call. But modern privacy concerns have lead many people to block the Caller ID signals on all their outgoing calls, thereby making traditional call-returns services inoperable for many calls.

Because a traditional call-return service cannot return a call to a number left in a voice message, a user must dial the phone number in that message in order to return the call. Even in the case of voice-dialing systems, this creates an added burden on the user of a call-return service. The user must go through the extra mental steps involved in remembering the phone number and then repeating it back to the voice-dialing system.

In addition, if the user wishes to save the phone number for later use, but not the voice message, the user is forced to write the number down or remember it long enough to input it into their user directory system. When the user is operating a wireless phone in some situations, these added distractions introduce undesirable hazards and/or delays.

Therefore, what is needed is a method and apparatus for enabling easier placement of return calls to voice messages that contain a phone number.

SUMMARY OF THE INVENTION

This invention can be regarded as a method of enabling provision of communication services based upon the content of a voice message. The method includes the steps of receiving a command, selecting a voice message, and processing the voice message using speech recognition. The method further includes the steps of isolating a spoken number in the voice message, and initiating provision of a communication service using the spoken number, the communication service being based upon the command. In this fashion, the present invention enables return calls to be generated from voice messages without the use of caller ID information, and without the need to remember or write down a telephone number.

This invention can also be regarded as a method of generating telephone numbers from voice messages. The method includes the step of using speech recognition to isolate a spoken number in a voice message, and confirming to a high degree of accuracy that the spoken number represents a telephone number. The method further includes the step of converting the spoken number into a data sequence representing the telephone number. This data sequence is then made available for immediate or later use. In this way, telephone information contained within a voice message need not be written down or remembered.

Further features and advantages of the invention as well as the structure and operation of various embodiments of the invention are described in detail below with reference to the accompanying drawings.

DETAILED DESCRIPTION OF THE INVENTION

The present invention is directed toward a method and apparatus for activating telephone services utilizing telephone numbers contained within voice messages. The present invention is disclosed and described herein in terms of specific calling apparatus and specific telephone networks. Description in these terms is provided for ease of discussion only. After reading this description, it will become apparent to one of ordinary skill in the art how to implement the invention in alternative embodiments and alternative network environments. As such, the description of these example embodiments should not be construed to limit the scope and breadth of the present invention.

Figure 1:
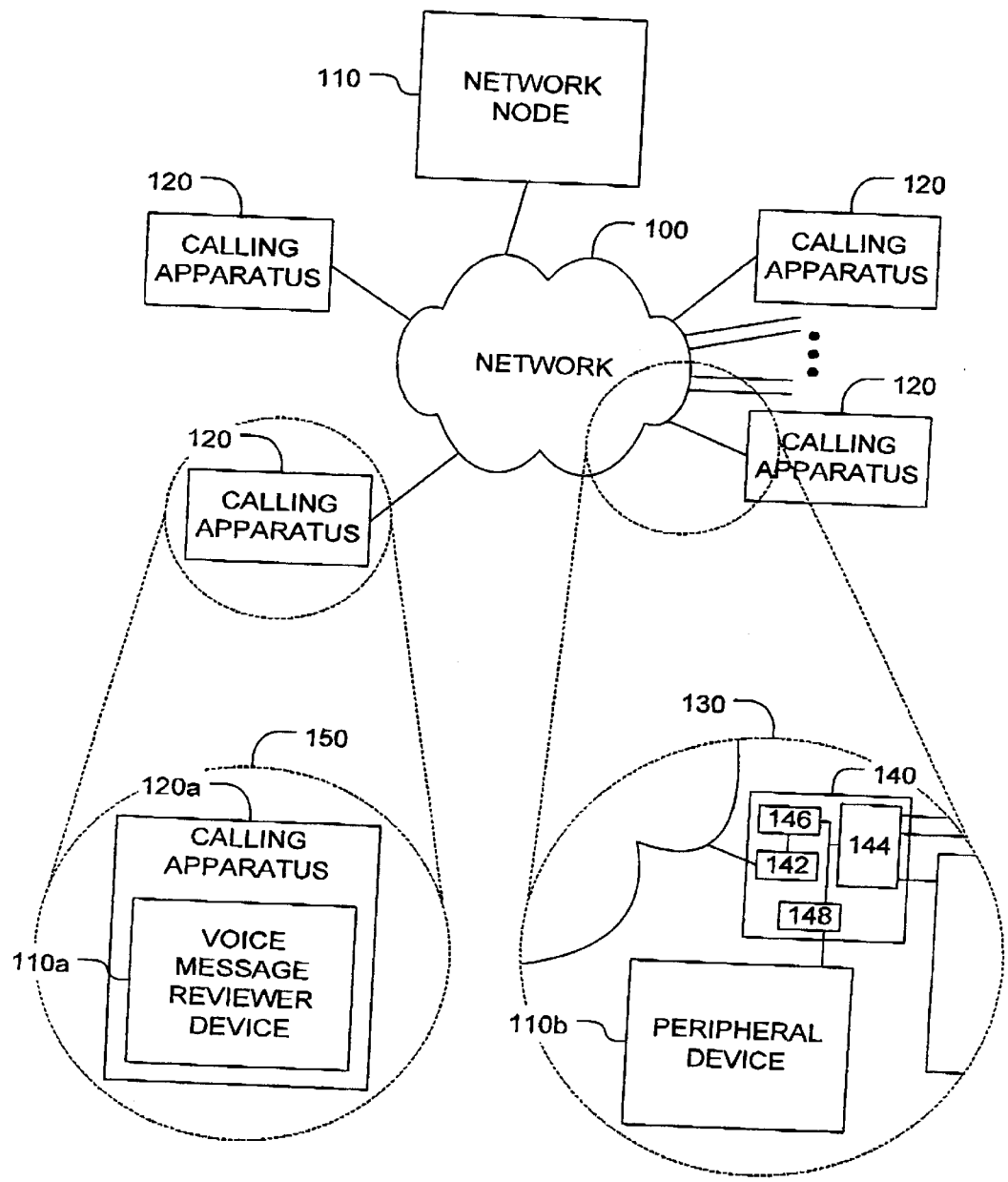
FIG. 1 is a block diagram depicting an exemplary operational environment according to multiple embodiments.

FIG. 1 is a block diagram depicting an exemplary operational environment according to multiple embodiments. Speech recognition techniques for implementing voice-dialing are well understood in the art. These techniques have been applied in both a telephone and telephone network context. The present invention utilizes speech recognition techniques as well, and is applicable in many telephone and telephone network environments/embodiments.

Referring now to FIG. 1, a network 100 provides a communications medium connecting a plurality of calling apparatus 120. By way of example and not limitation, the calling apparatus 120 may be any number of communication devices, such as wireless phones, conventional telephones, or personal computers equipped with communications hardware/software. In one embodiment, the network 100 is a public switched telephone network, which receives dual tone multi-frequency ("DTMF") signals, thereby establishing telephone connections in a manner well understood in the art. Alternatively, the network 100 is a wireless network, the Internet, an ATM network, or any network through which voice messages may be sent and received. As used herein, the term "voice message" includes any spoken message in either analog or digital form regardless of the originating source, source device or source network.

In one embodiment, a network service customer accesses a network node 110, which is designed to provide the functionality described herein, by dialing a node access number, such as a "1-800" number, or by selecting a control-input that causes an access-connection to be established, such as by pressing a button on a wireless phone. The network service customer then interacts with the network node 110, thereby obtaining the services described herein. One skilled in the relevant art(s) will understand how to design and construct the network node 110 given the disclosure herein.

In an alternative embodiment, the network service customer accesses the network node 110 at dial tone. For example, an expanded view 130 shows a portion of the network 100 that has been separated from the main body of the network 100 to better illustrate the alternative embodiment. A peripheral device 110b is designed to interface with a network switch 140. The network switch 140 handles network connections for one or more calling apparatus 120 and utilizes peripheral device 110b to provide the functionality described herein.

In one embodiment, the network switch 140 includes a first network interface 142 coupled with the network 100, a telephone interface 144, which is coupled with the one or more calling apparatus 120, and a DTMF detector 146 coupled with the telephone interface 144 and the first network interface 142. The network switch 140 also includes a second network interface 148, such as a T1 interface, which is coupled with the DTMF detector 146 and with the peripheral device 110b. The DTMF detector 146 monitors signals on the first network interface 142 and the telephone interface 144. When the DTMF detector 146 identifies DTMF tones representing a telephone number, it routes the call in a manner well understood in the art. In all other cases, the DTMF detector 146 interfaces with the peripheral device 110b via the second network interface 148, such that the peripheral device 110b is enabled to control the network switch 140, thereby allowing the peripheral device 110b to implement the functionality described herein.

In addition to the various network embodiments, multiple telephone embodiments are also possible. By way of example and not limitation, an expanded view 150 shows a class of telephone embodiments. In these embodiments, a voice message reviewer device 110a is integrated into a calling apparatus 120a. In alternative telephone embodiments, the voice message reviewer device 110a is external to the calling apparatus 120a and interfaces with the calling apparatus 120a via a wireless connection or via a data adapter, which includes an interface jack, such as an RJ-22 jack or an RJ-11 jack.

Figure 2:
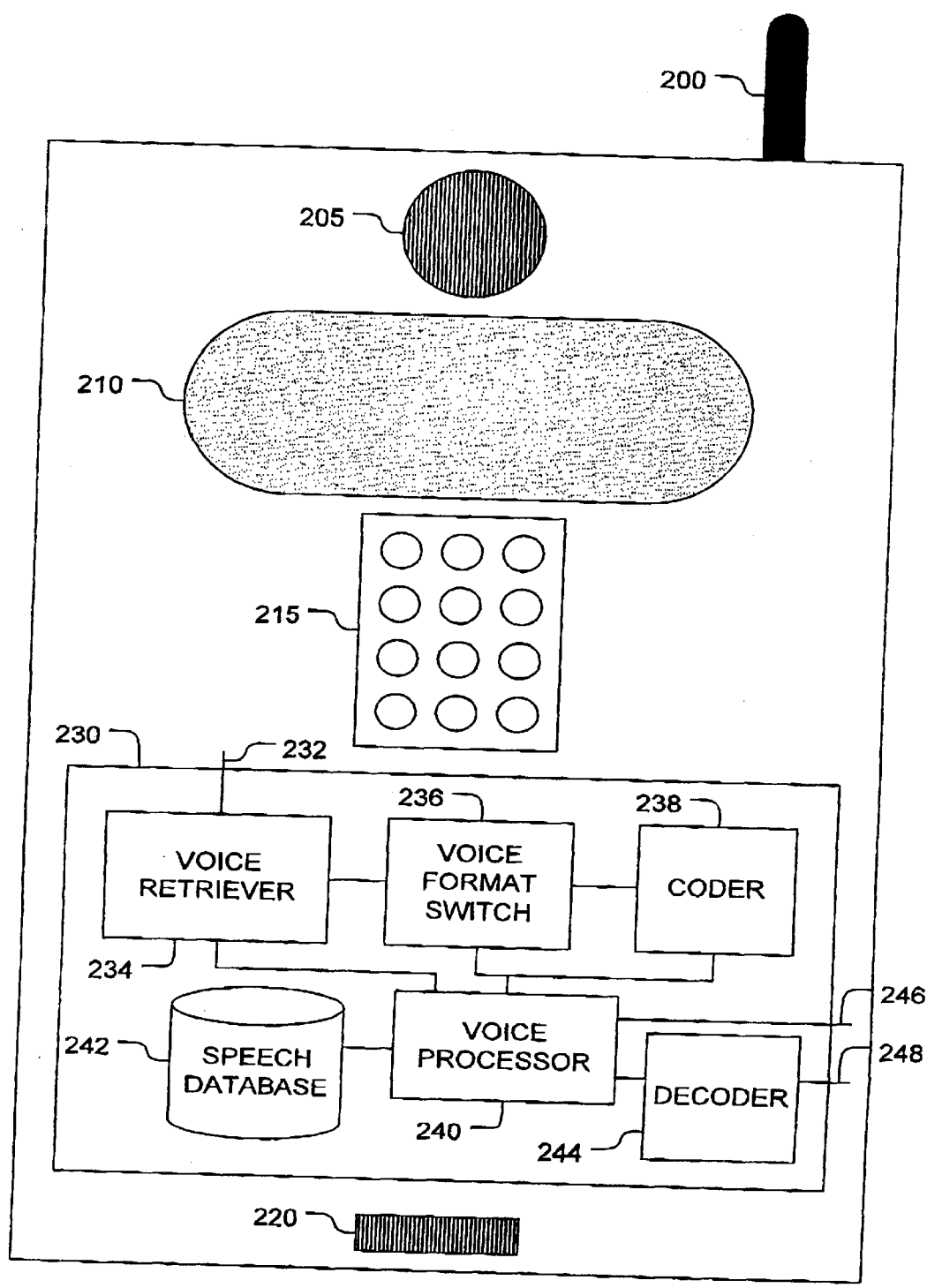
FIG. 2 is a block diagram depicting components of an exemplary wireless phone embodiment of the present invention.

One such integrated telephone embodiment is now described. FIG. 2 is a block diagram depicting components of an exemplary wireless phone embodiment of the present invention. The use of this exemplary embodiment is for ease of discussion only and does not limit the scope of the present invention. The wireless phone includes standard components such as an antenna 200, which provides an interface with the network 100 (FIG. 1), a speaker 205, a display 210, a keypad 215, and a microphone 220. In addition, the wireless phone includes a voice message reviewer device 230.

In one embodiment, the voice message reviewer device 230 includes an input line 232, a voice retriever 234, a voice format switch 236, a coder 238, a voice processor 240, a speech database 242, a decoder 244, a command output line 246, and a voice output line 248. The input line 232 provides voice data input to the voice message reviewer device 230, in either analog or digital format. The voice retriever 234 obtains a current voice input from either the microphone 220, a line providing a currently playing message being provided to the speaker 205 from a voice message database (not shown), or the voice message database. The voice message database may be part of the wireless phone shown in FIG. 2, or a separate database accessible through the network 100 (FIG. 1) via the antenna 200.

This exemplary embodiment implements both voice-dialing functionality and the functionality of the present invention in a single voice message reviewer device 230. Thus, the voice retriever 234 obtains voice commands from a user in its default operation mode. Upon an appropriate command, the voice retriever 234 obtains a voice message from the voice message database. This appropriate command may be a voice command, such as "CALLBACK", received by the microphone 220 and obtained by the voice retriever 234, or it may be any other appropriate command signal, such as a signal generated by a button being pushed on the keypad 215. Moreover, the voice retriever 234 keeps track of the current state of operation of the voice message reviewer device 230 and communicates this information to the voice processor 240.

In an alternative embodiment, the voice retriever 234 obtains voice commands from the user and obtains voice messages from the line providing a currently playing message in parallel. In yet another embodiment, the voice message reviewer device 230 is dedicated to reviewing voice messages and does not handle voice commands for voice-dialing functionality.

Voice data obtained by the voice retriever 234 is provided to the voice format switch 236. The voice format switch 236 determines whether the voice data input is analog or digital data. If digital data, it is passed directly to the voice processor 240. If analog data, it is passed to the coder 238, which encodes the voice data as digital data, before passing it to the voice processor 240. In an alternative embodiment, where the voice data is known to be digital data, neither the voice format switch 236 or the coder 238 are used.

The voice processor 240 applies a speech recognition algorithm to the voice data. In one embodiment, the speech recognition algorithm computes probabilities that the voice data corresponds to one or more voice representations stored in the speech database 242. Theses voice representations include a list of commands. When the voice message receiver device 230 is in a command interpretation state, the voice processor 240 identifies voice representations comprising sets of words corresponding to specific user commands from the list of commands. When the voice message receiver device 230 is in a message review state, the voice processor 240 identifies voice representations comprising sets of words corresponding to numerals and, in one embodiment, one or more tags.

As is well understood in the art, the voice processor 240 may be built using multiple speech recognition circuits and/or multiple speech recognizer arrays. The speech recognition circuits may include speaker-dependent and speaker-independent speech recognition circuits. But the voice processor 240 preferably implements some form of speaker-independent speech recognition for voice messages. Speaker-independent speech recognition techniques are well known in the art and are thus not discussed in detail herein.

Moreover, although the voice processor 240 is labeled as a "processor", those skilled in the art understand that this functional block may be implemented using either shared or dedicated hardware, including, but not limited to, hardware capable of executing software. Thus, in one embodiment, the voice processor 240 is a dedicated digital signal processor ("DSP"). In an alternative embodiment, the voice processor 240 represents a DSP component, which is part of a general processor comprising one or more processing components.

For example, in one embodiment, additional processors are provided, such as an auxiliary processor to manage input/output, an auxiliary processor to perform floating point mathematical operations, a back-end processor (a slave processor subordinate to the main processing system), an additional microprocessor or controller for dual or multiple processor systems, or a coprocessor. Those skilled in the art understand that these auxiliary processors may be discrete processors or may be built in to the general processor.

In one embodiment, the speech database 242 also stores a contacts list, speech templates for each person in the contacts list and a list of phone numbers, in addition to storing the voice representations needed for message review. In one embodiment, the speech database 242 resides in a temporary memory (not shown) and a permanent memory (not shown). The temporary memory is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like.

The permanent memory may include, for example, semiconductor-based memory such as programmable read-only memory (PROM), erasable programmable read-only memory (EPROM), electrically erasable read-only memory (EEPROM), or flash memory (block oriented memory similar to EEPROM). Alternative embodiments have alternative memory configurations including, for example, disk drive memory devices, a shared memory, or only a single permanent memory. Generally, the memory (permanent and/or temporary) provides data storage for the voice processor 240 and, in one embodiment, software storage for the voice processor 240.

The voice-dialing functionality implemented using the voice processor 240 and the speech database 242 are well known to those skilled in the relevant art(s). When the voice processor 240 identifies a command, it implements that command by outputting a command signal on the command output line 246. When additional information is needed from the user, the additional information is identified by outputting a command signal on the command output line 246, which causes the information request to be displayed on the display 210, or by sending a digital voice request to the decoder 244, which converts the digital voice request to an analog voice request and outputs it to the speaker 220 via the voice output line 248.

In one embodiment, the command output line 246 is coupled with a communications bus (not shown). The communication bus includes a data channel for facilitating information transfer between the various components of the wireless phone, such as, for example, a DTMF generator. The communication bus further provides the set of signals required for implementing the present invention, including a control bus. The communication bus may comprise any known bus architecture according to promulgated standards, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and the like.

It will be appreciated by those skilled in the relevant art(s) that the message reviewer device 230 and the functionality described herein may be implemented in hardware, software, or a combination thereof. In an embodiment where the invention is implemented using software, the software may be stored in the permanent memory, other storage components of the wireless phone, or received from the network 100 (FIG. 1) via the antenna 200. The software, when executed by the voice processor 240, causes the voice processor 240 to perform the features and functions of the invention as described herein.

In another embodiment, the invention is implemented primarily in hardware using, for example, hardware components such as application specific integrated circuits ("ASICs"). Implementation of the hardware state machine so as to perform the functions described herein will be apparent to persons having ordinary skill in the relevant art(s).

Figure 3A:
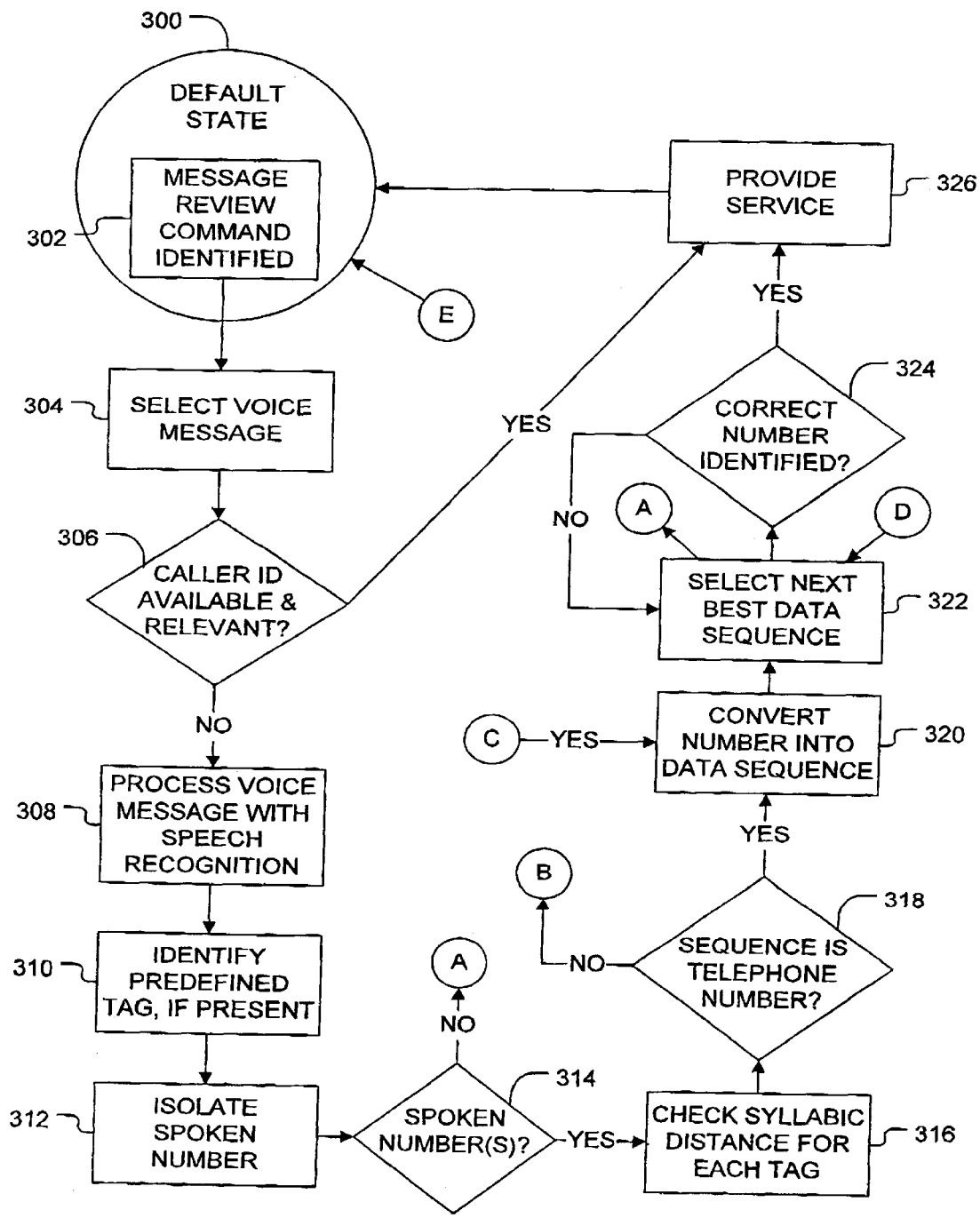
FIGS. 3A and 3B are a flow chart illustrating operation of a voice message review apparatus during voice message processing according to one embodiment.
Figure 3B:
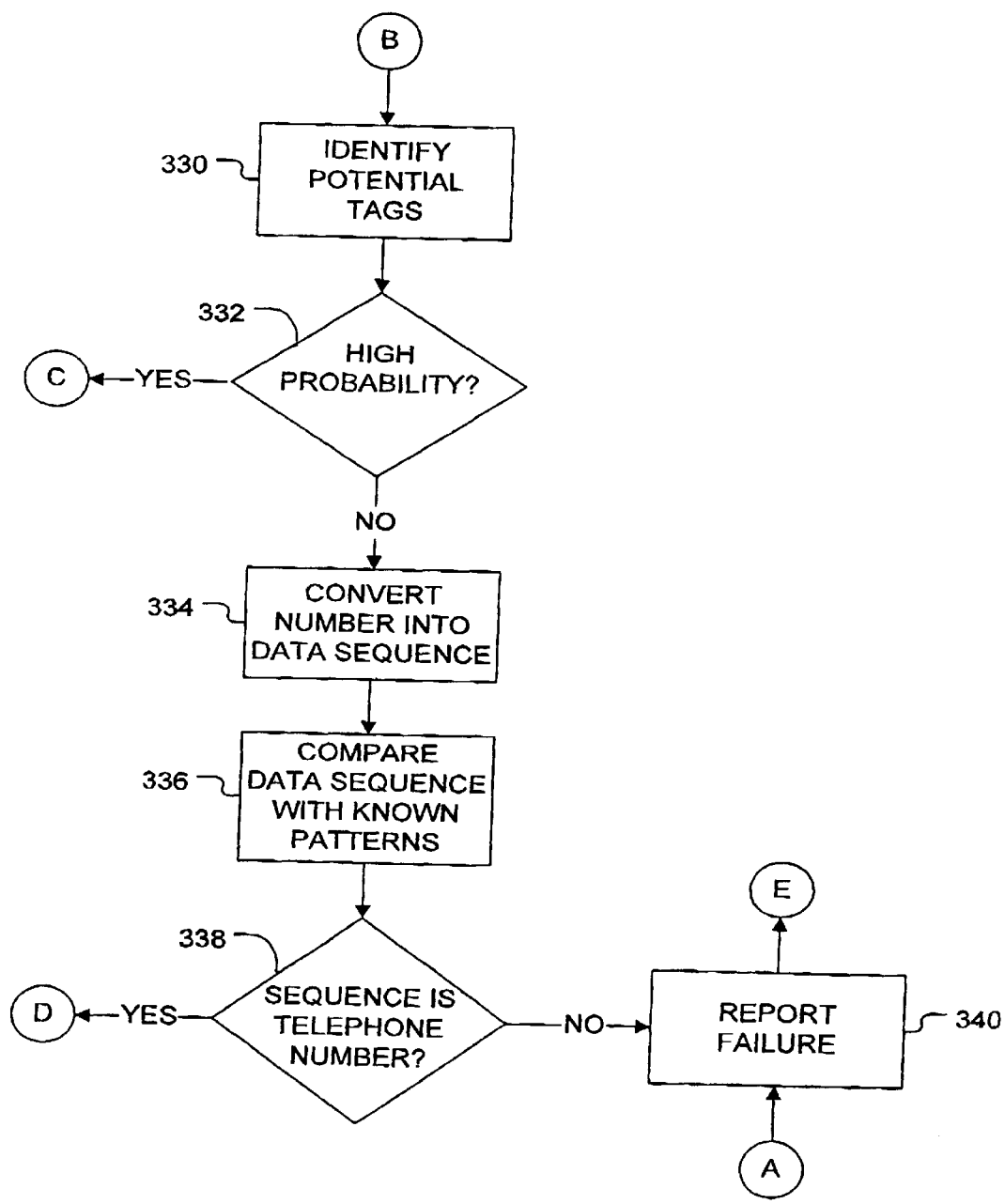

FIGS. 3A and 3B are a flow chart illustrating operation of a voice message review apparatus during voice message processing according to one embodiment. Referring now to FIG. 3A, a default state 300 represents the default state of operation. In this exemplary embodiment, the default state 300 is active monitoring of a voice input for voice commands, thereby enabling voice-dialing. A set of message review commands are included in the list of commands that are identified in the default state 300.

In an alternative embodiment, the voice message review apparatus actively processes voice messages automatically during playback. In yet another embodiment, the voice message review apparatus processes a voice message as it is received and stored, thereby enabling storage of a callback telephone number along with the voice message.

When a command from the set of message review commands is identified in step 302, the message review process begins. In step 304, a voice message is selected. By default, the selecting step 304 selects the voice message based upon a current message. For example, when a user begins playback of a voice message, this changes the current message to the voice message being played to the user. The current message stays the same until the user identifies a new voice message to review. Thus, the user may finish reviewing a voice message, engage in other activities for a while, and then issue a message review command, such as "CALLBACK", to initiate a communication service using a spoken telephone number contained within the voice message last reviewed.

In addition, the user may include alternate message information with the message review command, thereby causing the selection step 304 to select a different voice message. For example, in one embodiment, the user may issue a message review command such as "CALLBACK MESSAGE THREE." This causes the selection step 304 to select/retrieve a third voice message stored for the user.

Once the appropriate voice message is selected in step 304, this message is checked for any attached, and relevant, caller ID information. For example, in one embodiment, the message review commands are divided into categories, which allow the user to specify whether to use caller ID information, if available, by the nature of the issued command. Thus, the user may say "CALLBACK" to generate a return phone call to the selected message, whereby caller ID information is used, if available. If such caller ID information is found not to be available in step 306, the process proceeds to step 308, and if such caller ID information is found available in step 306, the process proceeds to step 326, thereby saving processing time. Alternatively, the user may say "CALLBACK NUMBER" to generate a return call to a phone number left in the selected message, regardless of whether caller ID information is available. Thus, the nature of the issued command causes the caller ID information to be irrelevant, and the process proceeds from step 306 to step 308.

In an alternative embodiment, the process proceeds from step 306 to step 308 regardless of whether caller ID information is available. If a telephone number is identified in the selected message, and that telephone number is different than the caller ID number, an arbitration process is performed to determine which telephone number to use for the communication service. Such arbitration processes are known to those skilled in the art. Alternatively, the user is simply queried as to which telephone number to use if they are different.

In step 308, the selected voice message is processed using speech recognition techniques. In a preferred embodiment, the speech recognition techniques include use of a set of speaker-independent speech templates. In one embodiment, the entire selected voice message is processed, and potential numbers and tags are flagged for later processing, in which case steps 310 and 312 are part of step 308. In an alternative embodiment, the selected message is fully processed in a sequential fashion, in which case steps 310 through 324 and steps 330 through 340 (FIG. 3B) are all contained within step 308. Those skilled in the art understand that the sequential ordering of steps shown and described herein is presented for ease of discussion only, and this particular ordering of the steps is not required.

In step 310, predefined tags are identified, if present in the voice message. In one embodiment, predefined tags are utilized to aid in identification of a telephone number contained within a voice message. For example, if a predefined tag consists of the word "MARK", a voice message may comprise the words, ". . . you can reach us at, mark, one, eight hundred, eight four six, four two oh eight." The work "MARK" contained within the message helps to identify the beginning of a telephone number. In an alternative embodiment, the predefined tag consists of a signal other than a voice signal representing a word. For example, in one embodiment, the predefined tag signal is a DTMF signal.

In step 312, a spoken number contained within the selected message is isolated. This is accomplished by looking for a sequence of spoken numbers within the selected message and storing information regarding the positions of all such number sequences within the selected message. In addition, a base probability is assigned to each such number sequence found in step 312. For example, in one embodiment, the base probability is set based upon a deviation of the time length of the number sequence from an average time length for spoken telephone numbers, and a presumed normal curve. In an alternative embodiment, multiple averages and presumed normal curves are used, thereby taking account of the different formats in which telephone numbers may be presented: with or without area code information, and with or without country code information. This base probability, or probability measure, represents an estimated probability that the number sequence is a telephone number.

Step 314 checks whether any number sequences were isolated in step 312. If not, control passes to step 340 on FIG. 3B. If at least one number sequence has been isolated, the process moves on to step 316.

In step 316, a syllabic distance between each tag and each number sequence is checked, for each predefined tag found in step 310, if any. If a syllabic distance of zero is found (i.e. there are no words or syllables between the found tag and the first word of the number sequence), this represents a high probability that the number sequence is a telephone number. In this case, the probability measure for this number sequence is changed accordingly. For example, in one embodiment, a number sequence with a preceding predefined tag and a syllabic distance of zero has its probability measure changed to ninety-five percent. For larger syllabic distances, the intervening words or syllables are analyzed before the probability measure is changed. For example, if the intervening syllable is "uh", this represents only a small decrease in the increased probability created by the identification of the predefined tag (i.e. the effective syllabic distance is zero).

Once the probability measures for each number sequence have been adjusted as needed, these probability measures are assessed in step 318. If one such sequence clearly stands out as a telephone number, such as by being the only number sequence with a probability measure greater than or equal to ninety-five percent, the process proceeds to step 320. Otherwise, the process moves to step 330 on FIG. 3B. In one embodiment, step 318 will only identify a number sequence as clearly a telephone number, if an effective syllabic distance of zero was identified for only one number sequence in step 316. In an alternative embodiment, the step 318 is skipped, and the process always proceeds to step 330 on FIG. 3B.

In step 320, all number sequences with a probability measure above a preset cutoff are converted into data sequences. In one embodiment, the preset cutoff is seventy-five percent. After conversion, the data sequence with the best corresponding probability measure is selected in step 322. Step 324 checks whether this data sequence is the desired telephone number.

For example, in one embodiment, if only one number sequence was converted in step 320, the process simply moves on to step 326. If more than one number sequence was converted in step 320, the user is requested to confirm that the data sequence is the desired telephone number. If the user rejects the data sequence, the process returns to step 322 to select the next best data sequence. If all data sequences are rejected by the user, the process leaves step 322 and proceeds to step 340 on FIG. 4B.

Once the process reaches step 326, it initiates the requested communication service. For example, in one embodiment, if the command was "CALLBACK", a phone call to the telephone number identified by the data sequence is initiated. Appropriate preceding area code information, or other presumed information, is added to the data sequence as needed. If the command was "STORE UNDER GATEWAY", a storage operation is initiated, whereby the telephone number identified by the data sequence is stored in a user directory under the specified identifier, here, "Gateway." Following step 326, the process returns to the default state 300.

Referring now to FIG. 3B, beginning with step 330, additional assessments of the probability measures are performed. In step 330, potential tags are identified to aid in verification of a telephone number contained within the selected message. These potential tags are different from the predefined tag in that they are derived from common word usage and not specified by the particular implementation. For each number sequence isolated in step 312 (FIG. 3A), the words surrounding the number sequence are examined using speech recognition to identify these potential tags.

For example, in one embodiment, potential tags, such as the words "NUMBER", "PHONE" or "AT", are searched for. When such potential tags are found, the syllabic distance between each potential tag and each number sequence is assessed. Smaller syllabic distances result in greater probability that the number sequence is a telephone number, and the probability measure for each number sequence is changed accordingly.

Moreover, these potential tags are preferably searched for in conjunction with each other. Thus, the word "PHONE" followed by the word "NUMBER" followed by a number sequence creates a larger probability that the number sequence is a telephone number than does just the word "NUMBER" alone.

Once the probability measures for each number sequence have been adjusted as needed, these probability measures are assessed in step 332. If one such sequence clearly stands out as a telephone number, such as by being the only number sequence with a probability measure greater than or equal to ninety-five percent, the process proceeds to step 320 on FIG. 3A. Otherwise, the process moves to step 334. In one embodiment, the process skips step 332 and always proceeds to step 334.

In step 334, all number sequences are converted into data sequences. After conversion, each data sequence is compared with known telephone number patterns in step 336. Data sequences that fit such known patterns are more likely to be telephone numbers, and the probability measures are adjusted accordingly. For example, telephone numbers should be at least seven or ten digits in length but should not be eight or nine digits in length. Moreover, number sequences that are greater than eleven digits may be compared with known country code number information as part of step 334.

In step 338, the newly adjusted probability measures are checked to see if any are above a preset cutoff. If so, control passes to step 322 on FIG. 3A. If not, control passes to step 340.

Step 340 is reached if the desired telephone number from the selected voice message is not identified. In step 340, this failure is reported, and the process returns to the default state 300 on FIG. 3A.

While various embodiments of the present invention have been described above, it should be understood that they have been presented by way of example only, and not limitation. It is to be understood that the description and drawings represent the presently preferred embodiments of the invention and are, as such, representative of the subject matter which is broadly contemplated by the present invention.

Furthermore, the scope of the present invention fully encompasses other embodiments that may become obvious to those skilled in the relevant art(s). For example, reference characters used to designate claim steps are provided for convenience of description only, and are not intended to imply any particular order for performing the steps. Thus, the breadth and scope of the present invention should not be limited by any of the above-described exemplary embodiments, but should be defined only in accordance with the following claims and their equivalents.

What is claimed is:

1. A method of enabling provision of a communications service comprising:
    receiving a command;
    selecting a voice message, the selecting step including tracking a message content, thereby establishing a current message and identifying the current message as the voice message when the command is received in the receiving a command step;
    isolating a spoken number in the voice message using speech recognition;
    identifying a tag in the voice message; and
    checking a syllabic distance between the tag and the spoken number, thereby using said distance for determining probability if the spoken number represents a telephone number;
    converting the spoken number into a data sequence representing the spoken number; and
    initiating provision of a communication service using the spoken number, the communication service being based upon the command.

2. The method of claim 1, wherein the tag is at least one spoken word.

3. The method of claim 2, wherein the identifying a tag step further comprises:
    identifying a first spoken word;
    identifying a second spoken word; and
    checking a syllabic distance between the first spoken word and the second spoken word.

4. The method of claim 1, wherein the tag is a dual tone multi-frequency signal.

5. The method of claim 1, further comprising comparing the data sequence with known telephone number patterns, thereby enabling confirmation that the spoken number represents a telephone number.

6. The method of claim 1, wherein the command is a verbal callback command, and wherein the initiating step comprises dialing a telephone number represented by the data sequence.

7. The method of claim 6, wherein the data sequence is a dual tone multi-frequency signal.

8. The method of claim 1, wherein the command is a verbal store command, and wherein the initiating step comprises causing storage of the data sequence in a user directory.

9. The method of claim 1, wherein the receiving a command step comprises:
    monitoring a voice input; and
    processing the voice input using speech recognition, thereby identifying the command.

10. The method of claim 9, wherein the processing the voice input step comprises enabling the command to reference an alternate message, and wherein the selecting step comprises identifying the alternate message as the voice message when the alternate message is referenced by the command.

11. The method of claim 1, further comprising checking for a stored caller ID signal associated with the voice message.

12. A method of generating telephone numbers from voice messages for use with a calling apparatus, comprising:
    using speech recognition to isolate a spoken number in a voice message, wherein using the speech recognition step utilizes speaker-independent speech recognition;
    confirming that the spoken number represents a telephone number, said confirming step including identifying a tag in the voice message checking syllabic distance between the tag and the spoken number, thereby using said distance for determining probability if the spoken number represents a telephone number;

converting the spoken number into a data sequence representing the telephone number; and checking for a stored caller ID signal associated with the voice message, if a stored caller ID signal is present, comparing said spoken number with said stored caller ID signal.

13. The method of claim 12, wherein the tag is at least one spoken word.

14. The method of claim 13, wherein the identifying a tag step further comprises:

identifying a first spoken word;

identifying a second spoken word; and checking the syllabic distance between the first spoken word and the second spoken word, thereby confirming the identification of at least one spoken word.

15. The method of claim 12, wherein the tag is a dual tone multi-frequency signal.

16. The method of claim 12, wherein the confirming step comprises comparing the data sequence with known telephone number patterns.

17. The method of claim 16, wherein the data sequence is a dual tone multi-frequency signal.

18. A device for enabling provision of a communication service upon receipt of a given command, based upon information contained within a voice message, comprising:

means for using speech recognition to isolate a spoken number in the voice message;

means for confirming that the spoken number represents a telephone number, said confirming means including:

means for identifying a tag in the voice message;

means for checking a syllabic distance between the tag and the spoken number, thereby using said distance for determining probability if the spoken number represents a telephone number; and means for comparing the data sequence with known telephone number patterns;

means for converting the spoken number into a data sequence representing the telephone number;

means for checking for a stored caller ID signal associated with the voice message, if a stored caller ID signal is present, comparing said spoken number with said stored caller ID signal; and means for providing a communication service using the data sequence.

19. The device for claim 18, wherein the tag is at least one spoken word.

20. The device of claim 18, wherein the tag is a dual tone multi-frequency signal.

* * * * *